United States Patent

Kageyama et al.

Patent Number: 5,656,390
Date of Patent: Aug. 12, 1997

[54] REDOX BATTERY

[75] Inventors: Yoshiteru Kageyama; Toshiyuki Tayama; Kanji Sato, all of Kashima-gun, Japan

[73] Assignee: Kashima-Kita Electric Power Corporation, Ibaraki-ken, Japan

[21] Appl. No.: 589,002

[22] Filed: Jan. 19, 1996

[30] Foreign Application Priority Data

Feb. 16, 1995 [JP] Japan .................. 7-028339

[51] Int. Cl.$^6$ .................. H01M 4/86
[52] U.S. Cl. .................. 429/44; 429/105
[58] Field of Search .................. 429/101, 105, 429/44

[56] References Cited

U.S. PATENT DOCUMENTS

| | | | |
|---|---|---|---|
| 3,813,301 | 5/1974 | Carr | 136/86 A |
| 4,382,116 | 5/1983 | Gahn et al. | 429/34 |
| 4,496,637 | 1/1985 | Shimada et al. | 429/44 |
| 4,579,789 | 4/1986 | Fukuda et al. | 429/44 |
| 4,786,567 | 11/1988 | Skyllas-Kazacos et al. | 429/19 |

OTHER PUBLICATIONS

Patent Abstracts of Japan, vol. 12, No. 254 (E-634), Jul. 16, 1988, JP-A-63-040261, Feb. 20, 1988.
Patent Abstracts of Japan, vol. 13, No. 280 (E-779), Jun. 27, 1989, JP-A-01-067873, Mar. 14, 1989.
Patent Abstracts of Japan, vol. 9, No. 173 (E-329), Jul. 18, 1985, JP-A-60-047373, Mar. 14, 1985.

*Primary Examiner*—Stephen Kalafut
*Assistant Examiner*—Jonathan S. Krueger
*Attorney, Agent, or Firm*—Oblon, Spivak, McClelland, Maier & Neustadt, P.C.

[57] ABSTRACT

The present invention provides a redox battery using two layer, liquid permeable, porous electrodes, each having a porous electrode layer having high surface area comprising carbon fiber at the septum side and a porous electrode layer having low surface area comprising carbon fiber at the bipolar plate side. The battery has excellent properties such as high current density, low pump pressure loss, and high output.

9 Claims, 3 Drawing Sheets

① A, ① ' B = BIPOLAR PLATE
② = POROUS CARBON ELECTRODE HAVING LOW SURFACE AREA
③ = POROUS CARBON ELECTRODE HAVING HIGH SURFACE AREA
④ = MEMBRANE (ANIONIC POLYSULFONE MEMBRANE)
⑤ = SPACER
Lp(in) = ELECTROLYTIC SOLUTION INLET OF POSITIVE ELECTRODE
Lp(out) = ELECTROLYTIC SOLUTION OUTLET OF POSITIVE ELECTRODE
Ln(in) = ELECTROLYTIC SOLUTION INLET OF NEGATIVE ELECTRODE
Ln(out) = ELECTROLYTIC SOLUTION OUTLET OF NEGATIVE ELECTRODE

FIG. 1

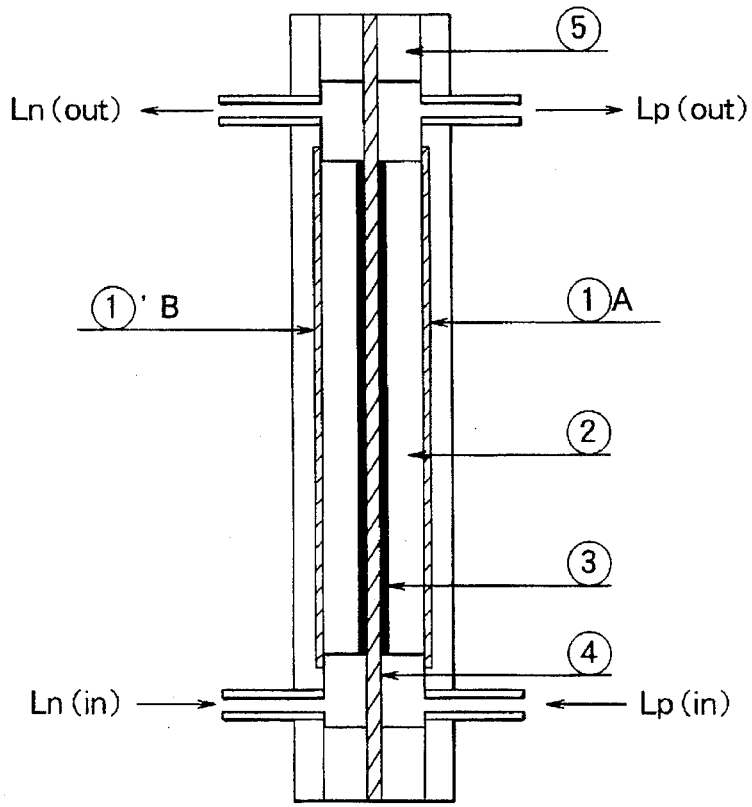

① A, ①' B = BIPOLAR PLATE
② = POROUS CARBON ELECTRODE HAVING LOW SURFACE AREA
③ = POROUS CARBON ELECTRODE HAVING HIGH SURFACE AREA
④ = MEMBRANE (ANIONIC POLYSULFONE MEMBRANE)
⑤ = SPACER
Lp (in) = ELECTROLYTIC SOLUTION INLET OF POSITIVE ELECTRODE
Lp (out) = ELECTROLYTIC SOLUTION OUTLET OF POSITIVE ELECTRODE
Ln (in) = ELECTROLYTIC SOLUTION INLET OF NEGATIVE ELECTRODE
Ln (out) = ELECTROLYTIC SOLUTION OUTLET OF NEGATIVE ELECTRODE

REDOX BATTERY

BACKGROUND OF THE INVENTION

1. Field of the Invention

The present invention relates to a secondary battery, in particular, a redox flow secondary battery (also called "a redux battery"), more specifically, an electrode structure of a high power redox battery, usable at high current density, and having low internal electrical resistance and pump power loss.

2. Description of the Related Art

In recent years, global warming due to an increase in atmospheric carbon dioxide is being focussed on as a problem resulting from the large-scale consumption of fossil fuels. Considering the circumstances, the development of solar batteries and clean sources of energy, has been actively pursued. However, since solar batteries cannot generate power at night or on rainy days, the development of suitable secondary batteries has been required.

Further, the efficiency of conventional power plants is decreasing due to the great difference in power demands between day and night. Therefore, leveling out the operation of the power plants by large scale power storage batteries has great significance for saving energy. Although storage of electric power has been a long-cherished dream for people in the field, only pumped storage power plants have been realized at the present stage. Accordingly, large scale power storage batteries are still a real necessity.

Redox batteries have great possibility as a new form of secondary batteries, because the batteries are chargeable by adapting the output voltage of solar batteries with a tap changer, and are easily scaled up due to their simple structures.

In redox batteries, charging and discharging are carried out by oxidation-reduction in which liquid active materials in the positive electrode and the negative electrode are circulated to liquid permeable electrolytic vessels. The redox batteries have the following advantages compared with conventional secondary batteries:

(1) Since storage capacity increases with increased container volume and active material contents, scaling-up the electrolytic vessel is not required unless the output power is increased.

(2) Since the positive and negative electrode active materials can be completely preserved separately in the container, the possibility of self discharge is low, differing from batteries in which active materials contact with electrodes.

(3) The reaction in the batteries is simple, because the charge and discharge reaction of the ions of active materials (electrode reaction) merely exchanges electrons on the electrode surfaces, differing from zinc-boron batteries in which zinc ions precipitate on the electrodes.

Although iron-chromium batteries, as a type of redox flow secondary battery, are known, the batteries have such problems as low energy density and mixing of the iron with chromium through the ion exchange membrane. Thus, a vanadium battery was proposed in Japanese Patent Laid-Open No. 62-186473. Vanadium batteries have such excellent properties as high electromotive force and battery capacity. Further, the electrolytic solution consists of one metal component. Therefore, even if positive and negative electrode electrolytic solutions mix together through the septum, these solutions can be easily regenerated by charging. However, in these conventional redox batteries, since available current density is around 60 mA/cm$^2$ at most, they are impossible to use at higher current densities.

In order to maintain higher power efficiency by adapting a higher current density of more than 80 mA/cm$^2$, in particular, 100 mA/cm$^2$, the cell resistance should be 1.5 $\Omega\cdot$cm$^2$ or less, preferably 1.0 $\Omega\cdot$cm$^2$. Considering the resistance of the electrodes and the conductivity of the electrolytic solutions as well as cell resistance, the cell thickness of the positive electrode chamber and the negative electrode chamber must be reduced. However, reduced cell thickness necessitates an increase in pump power for electrolytic solution permeation, resulting in decreased energy efficiency as shown in the following equation (1). Therefore, novel liquid permeable porous electrodes, which can reduce the internal resistance of a battery cell without reducing cell thickness, or which can improve the permeability of the electrolytic solution without increasing the internal resistance of the cell, must be developed.

$$\text{Energy efficiency}(\%) = \frac{(\text{discharged power} - \text{pump power at discharge})}{(\text{charged power} + \text{pump power at charge})} \times 100 \tag{1}$$

The differential pressure $\Delta P$, when the electrolytic solution passes through the liquid permeable porous electrode, can be expressed as the following equation (2) (Refer to "Kagaku Kogaku Enshu (Chemical Technology Exercise)" by Mitsutake, Sangyo Tosho, 1970).

$$\Delta P = 0.42 \frac{\mu u s^2 L}{\epsilon^3} \tag{2}$$

Wherein, $\mu$ represents the viscosity of the liquid, u represents the speed of the liquid passing through the electrode, s represents the specific surface area per unit weight, L represents the thickness of the electrode, and $\epsilon$ represents the rate of porosity, respectively.

It can be seen from equation (2) that effective methods for reducing the differential pressure $\Delta P$ are either increasing the rate of porosity $\epsilon$ of the electrode or decreasing the specific surface area s of the electrode. However, when increasing the rate of porosity $\epsilon$, the electrode area per unit volume decreases so that reactivity decreases and the internal resistance undesirably increases. Further, decreasing the surface area of the electrode also causes a decrease in electrode area per unit volume, resulting in an undesirable decrease in reductive activity. Thus, equation (2) demonstrates that reducing internal resistance is incompatible with reducing differential pressure $\Delta P$.

Conventional methods of reducing internal resistance are, for example, reducing cell thickness by excessively pressing the liquid permeable porous electrode, or increasing the total number of activation sites for oxidation-reduction per unit volume by densely packing the carbon fiber of the reactive, liquid permeable porous electrode. However, both methods decrease the rate of porosity, resulting in an increased differential pressure $\Delta P$.

Therefore, even though charge and discharge efficiency increases, these methods decrease total energy efficiency due to high pump power loss.

In contrast, a method for reducing pump power loss has been proposed by forming grooves, for circulating the liquid, along the flowing direction of the electrolytic solution on the carbon plate collector in Japanese Patent Laid-Open No. 2-148659, and another by placing a highly circulative, porous insulator between the porous electrode and the septum in Japanese Patent Laid-Open No. 2-148658. However, because cell resistance described in both of these pieces of prior art is only around 1.8 $\Omega\cdot$cm$^2$, they are not suitable for use in redox batteries of high current density.

As described above, it is essential for high current density to provide a large quantity of electrolytic solution. However, conventional electrodes have a structure wherein either cell thickness is reduced so as to decrease internal resistance, or circulation groove size is reduced by increasing the electrode density so as to decrease the electrode resistance, so that such problems as increased pressure loss of circulation in the electrodes and significantly increased pump power loss occur.

SUMMARY OF THE INVENTION

An object of the present invention is to provide a novel, high power redox battery, having high current density and low pump power loss, by developing an electrode enabling decreased internal resistance of a battery and reduced pressure loss during liquid circulation in an electrode. The high current density of the present invention represents 60 mA/cm$^2$ or more, desirably 80 mA/cm$^2$ or more, and preferably 120 mA/cm$^2$ or more.

The inventors of the present invention intensively investigated means to solve the above problems, and succeeded in the development of a liquid permeable porous electrode having certain special characteristics. As a result, the development of a redox battery has been completed in which the internal resistance of a cell can be reduced without reducing cell thickness, and the pump power loss due to circulation of the electrolytic solution can be decreased.

Accordingly, the present invention is to provide a redox battery, circulating electrolytic solution, comprising, positive and negative liquid permeable electrodes being provided on opposite surfaces of a septum, connected electrically in series by laminating alternately a plurality of cells comprising positive electrode chambers and negative electrode chambers wherein the chambers comprise the volume located between said septum and bipolar plates contacting each of said electrodes from the outside through said bipolar plates, with the positive electrolytic solution and negative electrolytic solution being circulated in a plurality of positive electrode chambers and negative electrode chambers, respectively, through a manifold provided in said cell, to charge and recharge the battery by oxidation-reduction;

wherein said liquid permeable electrodes each comprise two layers of porous carbon electrodes having at least the following characteristics (1) and (2);

(1) the septum side layer of said liquid permeable electrode is a porous electrode comprising carbon fiber having a diameter of 2 to 20 μm, with a surface area is 3 m$^2$/g or more;

(2) the bipolar plate side layer of said liquid permeable electrode comprising a carbon fiber having a diameter of 2 to 20 μm, and a surface area is 2 m$^2$/g or less.

According to the present invention, the differential pressure ΔP, when the electrolytic solution passes through the liquid permeable porous electrode, can be reduced without increasing cell thickness, and the internal resistance of the cell can be reduced without decreasing the cell thickness of the battery. Therefore, the present invention is able to provide a novel redox battery having high current density, low pressure pump power loss, high output, and high energy efficiency.

BRIEF DESCRIPTION OF THE DRAWINGS

FIG. 1 is an outlined schematic representation of a single cell constituting a battery of the present invention;

DETAILED DESCRIPTION OF THE PREFERRED EMBODIMENTS

Figure 2:
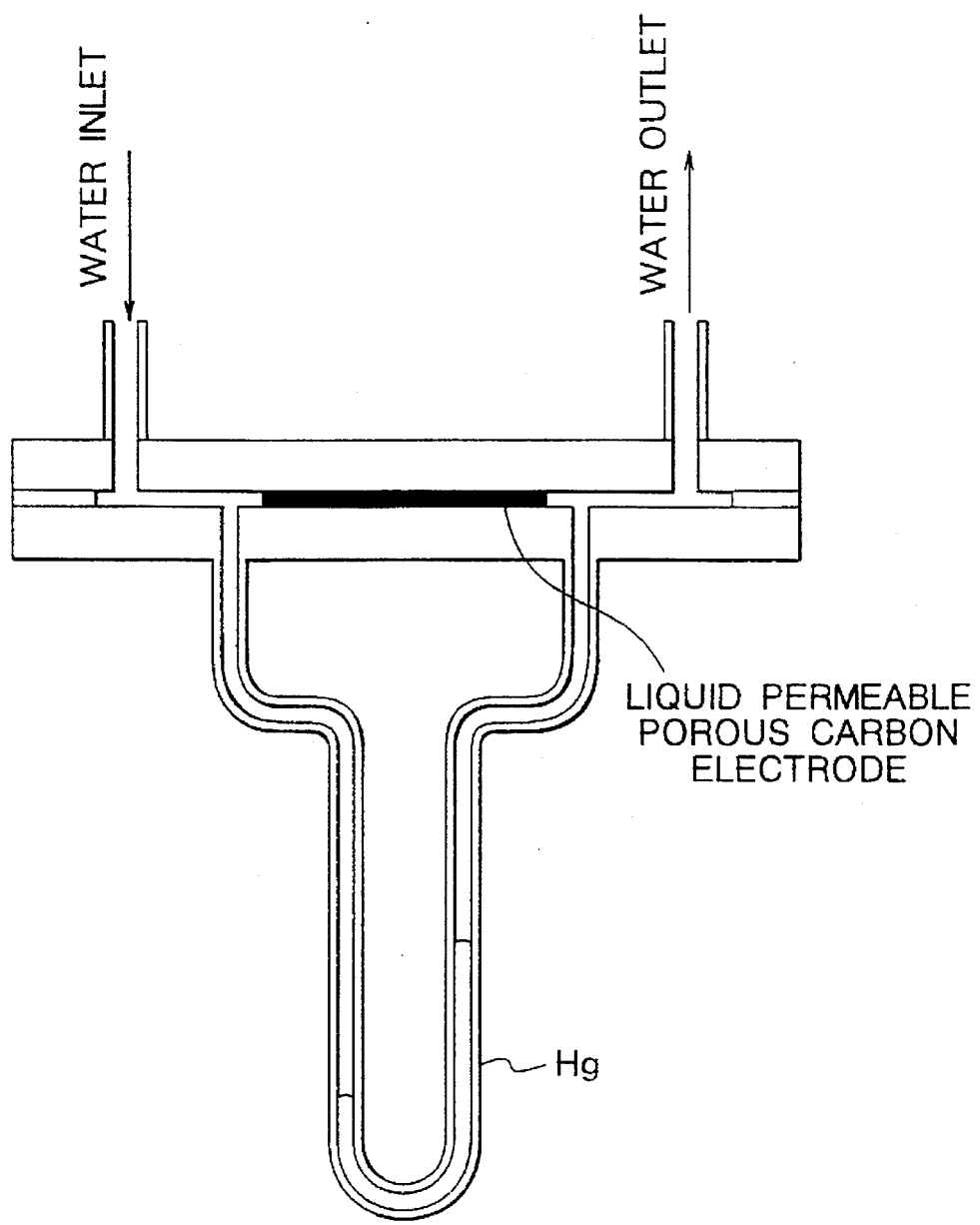
FIG. 2 is an outlined schematic representation of an apparatus measuring differential pressure, used in the Examples and Coparative Examples.

The present invention will now be explained in detail below.

The redox battery of the present invention comprises, as shown in FIG. 1, a septum 4 comprising an ion exchange membrane, carbon fiber electrodes 2 (positive electrode and negative electrode), that are permeable of the electrolytic solution and provided on both sides of the septum 4, and bipolar plates 1A and 1'B (collectors), made of sintered carbon plate, provided outside thereof, in which the positive solution, for example, pentavalent/tetravalent vanadium solution and the negative solution, for example, divalent/trivalent vanadium solution are transferred from the positive electrode reservoir and the negative electrode reservoir to the positive electrode and the negative electrode, respectively.

The redox battery of the present invention has multi-layered porous carbon electrodes provided, with a layer of the porous electrode 3 on the septum side comprising carbon fiber and having high surface area, and a layer of the porous electrode 2 on the bipolar plate side comprising carbon fiber and having low surface area.

The porous electrodes, having high surface area placed on the septum side, which is a constituent of the liquid permeable electrode of the present invention, and corresponds to the septum side layer of the electrode, comprises carbon fiber having a diameter ranging from 2 to 20 μm, preferably, 5 to 15 μm. Further, the porous electrode formed by this fiber has a specific surface area of 3 m$^2$/g or more, preferably from 6 to 100 m$^2$/g, more preferably from 8 to 60 m$^2$/g. The specific surface area of the present invention is defined as a result of a conventional BET measuring method. A surface area of less than 3 m$^2$/g decreases total number of active sites for oxidation-reduction, resulting in an undesirable decrease in the reaction rate. Although a higher surface area is desirable for higher reactivity, practical surface area is around 100 m$^2$/g.

Suitable raw fibers for producing a porous electrode having high surface area are fibers which can be carbonized, and have sufficient strength and elongation to make knitted items. Further, the fiber diameter after carbonization should be 2 to 20 μm and the surface area of the porous electrode formed from the fiber should be 3 m$^2$/g or more.

The carbon fibers can be produced by any conventional method, for example, by carbonizing the raw fiber at a temperature ranging from 800° to 2,000° C. in an inert gas, and then by keeping it at a temperature ranging from 500° to 1,500° C. in an atmosphere containing only a quantity of oxygen. The fiber can also be prepared by heating the raw fiber at a temperature ranging from 800° to 2,000° C. in a water steam atmosphere.

Examples of raw fibers used are cellulose fibers, acrylic fibers, phenol fibers, aromatic polyamide fibers, pitch fibers, and PAN fibers.

The crystal structure of the carbon fiber produced in such methods has an appropriate crystallite graphitization structure. Further, the lattice spacing $d_{002}$ determined by wide angle X-ray diffraction is 3.50 to 3.80 angstroms, preferably 3.50 to 3.65 angstroms, and/or the ratio of the amount of oxygen atoms to the amount of carbon atoms bonding to the surface of the carbon fiber (O/C ratio) is 0.05 or more, preferably 0.07 to 0.12. A lattice spacing $d_{002}$ exceeding 3.85 angstroms bring about a change in the crystal structure that mainly consists of a pseudo-graphitization structure from an amorphous carbon structure, resulting in an undesirable decrease in oxidation-reduction reactivity. On the other hand, a spacing of less than 3.50 angstroms brings about a change in the crystal structure so that it mainly consists of a graphitization structure, also resulting in an undesirable decrease in oxidation-reduction reactivity.

It is supposed that oxygen on the carbon fiber surface promotes oxidation-reduction. However, an O/C ratio of less than 0.05 does not bring about sufficient oxidation reduction effects. On the other hand, a much higher O/C ratio will bring about a surface carbon structure other than a pseudo-graphitization structure which is undesirable.

The wide angle X-ray diffraction was carried out as follows: A carbon fiber was ground with an agate mortar; 5 to 10 weight percent of a X-ray diffraction standard was added (using a high purity silicon powder as the X-ray diffractometry standard), to the ground fiber as an internal standard; the powder was packed into a sample cell; a wide angle X-ray diffraction pattern was obtained by transmittance diffraction using a Cu-Kα-ray source. The obtained curve was corrected by the following simplified method rather than by such well-known correction methods such as a Lorenz correction, polarization factor, absorption factor, or atomic scattering factor: The base line of the peak corresponding to the <002> diffraction line was drawn; each substantial intensity from the base line was plotted to obtain a corrected <002> diffraction curve. Next, was drawn parallel to the angle axis a line, having a height two-thirds of the peak height of the corrected curve, and the mid-point of a segment obtained by the intersection of the line and the curve was determined. After calibrating the angle of the mid-point with the internal standard, the <002> lattice spacing, $d_{002}$, was calculated by the following equation:

$$d_{002} = \lambda/2\sin\theta \ [\text{Å}]$$

where, $d_{002}$ represents <002> lattice spacing, $\lambda$ represents the wave length of the Cu-Kα-ray, i.e. 1.5418 angstroms and $\theta$ represents the diffraction angle corresponding to $d_{002}$.

The surface O/C ratio was determined by X-ray photoelectron spectroscopy (called as XPS or ESCA). The instrument used was an ESCA750 made by the Shimadzu Corporation, and the obtained peaks were analyzed With an ESCA-PAC760. After each sample was punched out of a disk having 6 mm diameter, they were attached on a heating-type sample holder with conductive paste and introduced into the measuring chamber. The samples were heated at 120° C. before measuring while evacuating the chamber for at least 3 hours. The X-ray source used was Mg-Kα-ray and the chamber was kept at $10^{-7}$ torr during the measuring process.

The porous electrode, having low surface area placed on the bipolar plate side, which is a constituent of the liquid permeable electrode of the present invention, and corresponds to the bipolar plate side layer of the electrode, comprises a carbon fiber having a diameter ranging from 2 to 20 μm, preferably, 5 to 15 μm. Further, the porous electrode formed by this fiber has a specific surface area of 0.01 to 2 $m^2/g$, desirably 0.1 to 1 $m^2/g$. Although this electrode does not directly participate in oxidation-reduction, a decreased surface area is desirable for reducing the differential pressure ΔP. A surface area exceeding 2 $m^2/g$ does not sufficiently reduce differential pressure.

The raw fibers used for the porous electrode having low surface area are made of the same materials as the raw fibers used for the above porous electrode having high surface area. The desirable fiber diameter after carbonization is 2 to 20 μm, and the desirable surface area of the porous electrode formed from the raw fiber is 0.01 to 2 $m^2/g$. Any conventional methods can be employed for producing the carbon fiber. For example, the carbon fiber can be obtained by heating the raw fiber at 800° to 2,000° C. in an inert gas atmosphere.

The crystal of the carbon fiber produced in such methods consists only or mainly of a crystallite graphitization structure having relatively low surface area. Further, the (002) lattice spacing determined with wide angle X-ray diffraction is 3.35 to 3.45 angstroms (the spacing of the complete graphitization structure is 3.35 angstroms), and/or the ratio of the amount of oxygen atoms to the amount of carbon atoms bonding to the surface of the carbon fiber, the O/C ratio, is 0.04 or less, preferably 0.01 to 0.02. A lattice spacing of ($d_{002}$) exceeding 3.45 angstroms or an O/C ratio exceeding 0.04 undesirably causes increased surface area due to disorder of the crystalline structure.

The form of the porous electrode obtained from the carbon fiber is not limited, and can be in the form of felt, rolled mat, knit, etc.

The multilayer electrode for redox batteries of the present invention can be formed by merely overlapping the above two types of porous electrodes, or by punching both porous electrodes with carbon fiber or the like to join them. Further, a similar fabricated electrode can be produced by re-heating the one surface layer of the above porous electrode having a low surface area at a temperature ranging from 500° to 1,500° C. in an atmosphere containing a small quantity of oxygen so that the surface is selectively converted to a porous electrode having high surface area.

In the multilayer porous electrode of the present invention, the thickness ratio of the porous electrode having high surface area (the septum side layer) to the porous electrode having low surface area (the bipolar plate side) usually ranges from 0.1:1 to 5:1, desirably 0.2:1 to 3:1, preferably 0.3:1 to 1:1.

The multilayer porous electrode of the present invention may be provided with grooves thereon along the liquid circulation direction in order to decrease pressure loss due to liquid passing through the electrode, by means of machining or mechanical compression. The grooves can be formed at either side or both sides of the multilayer porous electrode. The ratio of the grooves in the multilayer porous electrode must be controlled in order that the reaction of the redox battery is not affected. The ratio id defined by the value obtained by dividing the cumulative area of the bottoms of the grooves in the electrode by the total area or the lateral surfaces of the electrode. Thus, the ratio is desirably from 1 to 10%, preferably from 3 to 7%. When the ratio exceeds 10%, the reaction of the redox battery is affected and cell resistance increases. On the other hand, a ratio of less than 1% does not substantially show the pressure loss effect due to liquid passing through the electrode.

Any type of ion exchange membranes, such as anion exchange membranes and cation exchange membranes, can be used for the redox battery of the present invention. The electrolytic solutions normally used for the redox battery of the present invention are chloride solutions of iron and chromium for an iron-chromium battery, and sulfite solutions of vanadium for an all vanadium battery.

The present invention will now be explained in further detail by the following examples.

[EXAMPLE 1]

An experiment of charge and discharge was carried out using the redox flow battery cell shown in FIG. 1 at a current density 130 mA/cm$^2$, in which a vanadium sulfite solution (2M V$^{2+}$ to V$^{+5}$/2M H$_2$SO$_4$) was used for the electrolytic solution. A multiple porous electrode having a thickness of 3 mm, and comprising a septum side porous electrode having high surface area of "Graphite felt KFD-2" made by SGL CARBON Co., a felt carbon fiber, 2 mm thick, 10 μm in fiber diameter, having a BET surface area of 16 m$^2$/g, lattice spacing $d_{002}$ of 3.54 angstroms measured by wide angle X-ray diffraction, and an O/C atomic ratio of 0.091 by ESCA, was used along with a collector plate side porous electrode having low surface area of "Graphite felt GFD-2" made by SGL CARBON Co., a felt carbon fiber, 2.5 mm thick, 10 μm in fiber diameter, having a BET surface area of 0.47 m$^2$/g, lattice spacing $d_{002}$ of 3.45 angstroms measured by wide angle X-ray diffraction, and an O/C atomic ratio of 0.038 by ESCA. The passage of the electrolytic solution through the permeable porous electrode, instead of the pressure loss of the battery cell, was evaluated as follows. Using the apparatus shown in FIG. 2, the magnitude of the pressure loss was evaluated by the differential pressure indicated by the height of the mercury column when flowing pure water at a flow rate of 60 cc/min. The results are shown in Table 1.

[EXAMPLE 2]

Instead of the multilayer porous electrode used in EXAMPLE 1, a multilayer porous electrode having the following constitution, was similarly evaluated according to EXAMPLE 1. The septum side porous electrode having high surface area, was "XF-158", a felt carbon fiber, 2.0 mm thick, 12 μm in fiber diameter, surface area of 21 m$^2$/g, lattice spacing $d_{002}$ of 3.55 angstroms measured by wide angle X-ray diffraction, and an O/C ratio of 0.088 by ESCA, made by Toyobo Co. Ltd. The collector plate side porous electrode having low surface was "T-300", a felt carbon fiber, 2.0 mm thick, 10 μm in fiber diameter, surface area of 0.1 m$^2$/g s, lattice spacing $d_{002}$ of 3.43 angstroms measured by wide angle X-ray diffraction, and an O/C ratio of 0.028 by ESCA, made by Toray Industries Inc. The results are also shown in Table 1.

[EXAMPLE 3]

Instead of the multilayer porous electrode of EXAMPLE 1, a multilayer porous electrode was used comprising a septum side porous electrode having high surface area made of "XF-158" (used in EXAMPLE 2), and a collector plate side porous electrode having low surface area made of "Graphite felt GFD-2" (used in EXAMPLE 1). The multilayer porous electrode was evaluated according to EXAMPLE 1. The results are shown in Table 1.

[EXAMPLE 4]

Charge, and discharge were carried out at a current density of 160 mA/cm$^2$ using the electrode of EXAMPLE 2. The results are shown in Table 1.

[COMPARATIVE EXAMPLE 1]

Instead of the multilayer porous electrode used in EXAMPLE 1, an electrode comprising two layers of "Graphite felt KFD-2" (used for the septum side porous electrode having high surface area in EXAMPLE 1) was used. The electrode was evaluated similarly to EXAMPLE 1. The results are also shown in Table 1.

[COMPARATIVE EXAMPLE 2]

Instead of the multilayer porous electrode used in EXAMPLE 1, an electrode comprising two layers of "Graphite felt GFD-2" (used for the collector plate side porous electrode having high surface area in EXAMPLE 1) was used. The electrode was evaluated similarly to EXAMPLE 1. The results are also shown in Table 1.

[COMPARATIVE EXAMPLE 3]

Instead of the multilayer porous electrode used in EXAMPLE 1, an electrode comprising "Graphite felt GFD-2" (used for the collector plate side porous electrode having high surface area in EXAMPLE 1) as the septum side electrode and "Graphite felt KFD-2" (used for the septum side porous electrode having high surface area in EXAMPLE 1) as the collector plate side electrode was evaluated. The results are also shown in Table 1.

TABLE 1

| | Current Density mA/cm$^2$ | Current Efficiency % | Power Efficiency % | Voltage Efficiency % | Cell Resistance $\Omega \cdot$ cm$^2$ | Pressure Loss Hg |
|---|---|---|---|---|---|---|
| Example 1 | 130 | 94.5 | 83.0 | 87.8 | 1.02 | 54 |
| Example 2 | 130 | 97.0 | 81.5 | 84.1 | 0.76 | 46 |
| Example 3 | 130 | 96.3 | 84.7 | 87.9 | 0.97 | 50 |
| Example 4 | 160 | 94.0 | 81.3 | 86.5 | 1.23 | — |
| Com.Ex. 1 | 130 | 95.4 | 82.6 | 85.1 | 1.43 | 85 |
| Com.Ex. 2 | 130 | 95.2 | 67.5 | 68.4 | 1.72 | 38 |
| Com.Ex. 3 | 130 | 97.6 | 78.1 | 80.0 | 1.52 | 54 |

[EXAMPLE 5]

Figure 3:
FIG. 3 is a plan view illustrating an example of the porous carbon electrode having grooves.
Figure 4:
FIG. 4 is a side view of the porous carbon electrode shown in FIG. 3.

A similar experiment to EXAMPLE 1 was carried out except that a "Graphite felt GFD2" electrode of 10 mm by 100 mm by 2.5 mm, made by SGL CARBON Co., having grooves of 1.5 mm in thickness and depth shown in FIG. 3 and FIG. 4, was used as the collector plate side porous electrode having low surface area of the multilayer electrode. The results were 130 mA/cm$^2$ current density, 94.3% current efficiency, 82.8% power efficiency, 87.8% voltage efficiency, 1.06 $\Omega \cdot$cm$^2$ cell resistance, and 41 mmHg pressure loss.

[EXAMPLE 6]

In a redox flow battery having a practical scale, 45 cm by 80 cm, of battery cell for power storage, a charge and discharge experiment was carried out by using a collector plate side porous electrode having low surface area ("Graphite felt GFD-2" made by SGL CARBON Co.) in which grooves having a width of 1.5 mm and a depth of 1.5 mm were formed at intervals of 12 mm accross the width of the electrode, and a septum side porous electrode having high surface area ("Graphite felt KFD-2" made by SGL CARBON Co.) an electrolytic solution flow rate of 124 liters/hour, and a current density of 130 mA/cm$^2$.

The pressure loss, when the electrolytic solution passed through the multilayer porous electrode, was determined by the difference between the values of the pressure gauges placed upstream and downstream of the cell. The following results were obtained: 94.1% current efficiency, 82.5% power efficiency, 87.6% voltage efficiency, 1.07 Ω·cm² cell resistance, and 0.51 kg/cm² pressure loss when the electrolytic solution passed through the multilayer porous electrode.

[EXAMPLE 7]

A charge and discharge experiment was carried out to measure pressure loss when the electrolytic solution passed through a multiple porous electrode in a similar method to EXAMPLE 6, except that a multilayer porous electrode without grooves was used. The following results were obtained: 94.3% for current efficiency, 82.9% power efficiency, 87.9% voltage efficiency, 1.10 Ω·cm² cell resistance, and 1.1 kg/cm² pressure loss when the electrolytic solution passed through the multilayer porous electrode.

[COMPARATIVE EXAMPLE 4]

A charge and discharge experiment was carried out to measure pressure loss when the electrolytic solution passed through a multilayer porous electrode in a method similar to EXAMPLE 6, except that the multilayer porous electrode of COMPARATIVE EXAMPLE 1 was used. The following results were obtained: 95.7% current efficiency, 82.9% power efficiency, 87.9% for voltage efficiency, 1.52 Ω·cm² cell resistance, and 1.7 kg/cm² for pressure loss when the electrolytic solution passed through the multilayer porous electrode.

What is claimed is:

1. A redox battery, comprising:
   a plurality of cells connected electrically in series, wherein each cell comprises a positive electrode chamber and a negative electrode chamber, wherein the positive electrode chamber is separated from the negative electrode chamber by a septum, and wherein both the positive electrode chamber and the negative electrode chamber are formed by the volume contained between an inlet and outlet at each end of each chamber and between the septum and a plurality of bipolar plates, wherein each bipolar plate runs the length of each electrode chamber to which it is adjacent and contacts both the inlet and outlet associated with that electrode chamber;
   wherein the positive electrode chamber contains therein a positive liquid permeable electrode having a septum side layer in contact with a surface of the septum and a bipolar plate side layer in contact with the bipolar plate forming the positive electrode chamber and the negative electrode chamber contains therein a negative liquid permeable electrode having a septum side layer in contact with a surface of the septum opposite from the surface of the septum in contact with the positive liquid permeable electrode, and having a bipolar plate side layer in contact with the bipolar plate forming the negative electrode chamber;
   wherein electrolytic solution is circulated through each of the positive and negative electrode chambers to charge and recharge the battery by oxidation-reduction;
   wherein each of the positive and negative liquid permeable electrodes comprises two layers of porous carbon electrode material having at least the following characteristics (1) and (2):
   (1) the septum side layer of each of the positive and negative liquid permeable electrodes is a porous electrode comprising carbon fiber having a diameter of 2 to 20 μm, with a surface area of 3 m²/g or more;
   (2) the bipolar plate side layer of each of the positive and negative liquid permeable electrodes comprises carbon fiber having a diameter of 2 to 20 μm, and a surface area of 2 m²/g or less.

2. A redox battery according to claim 1, in which said septum side layer has a surface area of 6 to 100 m²/g.

3. A redox battery according to claim 1, in which said bipolar plate side layer has a surface area of 0.1 to 1 m²/g.

4. A redox battery according to claim 1, in which said carbon fiber forming said septum side layer has a lattice spacing $d_{002}$ of 3.50 to 3.80 angstroms, determined with wide angle X-ray diffraction, and/or where a ratio of the amount of oxygen atoms to the amount of carbon atoms bonding to the surface of said carbon fiber is 0.05 or more.

5. A redox battery according to claim 1, in which said carbon fiber forming said bipolar plate side layer has a lattice spacing $d_{002}$ of 3.35 to 3.45 angstroms, determined with wide angle X-ray diffraction, and/or where a ratio of the amount of oxygen atoms to the amount of carbon atoms bonding to the surface of said carbon fiber is 0.04 or less.

6. A redox battery according to claim 1, in which said positive electrode electrolytic solution is a pentavalent/tetravalent vanadium solution, and said negative electrode electrolytic solution is a divalent/trivalent vanadium solution.

7. A redox battery according to claim 1, in which a groove is formed on a surface of at least one layer of said porous carbon electrode.

8. A liquid permeable electrode for a redox battery comprising two layers of porous carbon electrodes, and having the following characteristics (1) and (2);
   (1) the septum side layer of said liquid permeable electrode is a porous electrode comprising carbon fiber having a diameter of 2 to 20 μm, with a surface area of 3 m²/g or more;
   (2) the bipolar plate side layer of said liquid permeable electrode comprising a carbon fiber having a diameter of 2 to 20 μm, and a surface area of 2 m²/g or less.

9. A liquid permeable electrode according to claim 8, in which grooves are formed on the surface of at least one layer of said porous carbon electrode.

* * * * *